United States Patent [19]

Hajikano et al.

[11] Patent Number: 4,837,855
[45] Date of Patent: Jun. 6, 1989

[54] NON-BLOCKING OPTICAL SPACE SWITCH

[75] Inventors: Kazuo Hajikano, Machida; Toshio Shimoe; Jyoei Kamoi, both of Kawasaki; Ippei Sawaki, Sagamihara; Koso Murakami, Yokohama, all of Japan

[73] Assignee: Fujitsu Limited, Kawasaki, Japan

[21] Appl. No.: 117,148

[22] PCT Filed: Jan. 19, 1987

[86] PCT No.: PCT/JP87/00027
§ 371 Date: Aug. 18, 1987
§ 102(e) Date: Aug. 18, 1987

[87] PCT Pub. No.: WO87/04886
PCT Pub. Date: Aug. 13, 1987

[30] Foreign Application Priority Data

Jan. 31, 1986 [JP] Japan .................................. 61-18084
Feb. 28, 1986 [JP] Japan .................................. 61-43319

[51] Int. Cl.⁴ ............................................. H04B 9/00
[52] U.S. Cl. ..................................... 455/600; 455/612; 370/1; 370/54; 340/825.8; 340/825.89

[58] Field of Search ........... 340/825.79, 825.8, 825.83, 340/825.89; 370/54, 55, 63, 64, 53, 59, 1, 3, 4; 379/163, 165, 166; 455/600, 601, 606, 607, 612, 617

[56] References Cited

U.S. PATENT DOCUMENTS

| | | | |
|---|---|---|---|
| 3,593,295 | 7/1971 | Joel | 340/825.8 |
| 3,674,938 | 7/1972 | Jacob | 340/825.8 |
| 4,608,682 | 8/1986 | Nagashima | 370/4 |
| 4,679,190 | 7/1987 | Dias | 370/60 |

FOREIGN PATENT DOCUMENTS

| | | | |
|---|---|---|---|
| 0002012 | 1/1978 | Japan | 370/4 |
| 0117311 | 10/1978 | Japan | 370/4 |
| 2172165 | 9/1986 | United Kingdom | 455/600 |

Primary Examiner—Robert L. Griffin
Assistant Examiner—Leslie Van Beek
Attorney, Agent, or Firm—Staas & Halsey

[57] ABSTRACT

An optical space switch is formed in such a manner that switch elements having two inputs and two outputs are arranged in an n×n matrix form and optical signals from n input highways are switched to n output highways. The switch elements are connected in such a manner that the optical signals are always passed through the same number of switch elements, from the input highways to the output highways.

8 Claims, 8 Drawing Sheets

NON-BLOCKING OPTICAL SPACE SWITCH

DESCRIPTION

1. Technical Field

The present invention relates to a structure of an n×n non-blocking optical space switch formed by $n^2$ switch elements having two inputs and two outputs, and in particular, it relates to a structure of an optical space switch which can be compactly integrated on a single substrate.

2. Background Art

Today, high speed information services such as high precision images, motion video, and a high definition motion video, in addition to conventional low speed information services such as voice and data up to 64 kb/s, are required for communication networks. For this purpose, optical transmission lines including subscriber lines have been applied to communication networks. Further, in an electric switching system, optical transmission lines have been applied between modules, for example, an interface between a time switch module and a highway switch module. But, in a present switching system, since the switching is realized by an electric logic circuit, highly expensive opto/electrical and electric/optical conversions are required for converting the information from an optical transmission line into electrical information, and vice versa. Further, if an electric device is operated at a high speed, the operation speed of the system is restricted due to capacitance loads or impedance mismatching in the electric circuitry. An optical switching system deals with the optical information from the optical transmission line directly, and therefore, the opto/electrical and electric/optical conversions are not required and thus the ability to handle high speed information is expected. As the optical switching system, a space-division switching system, a time-division switching system, and a wavelength-division switching system are under consideration at present. Among these systems, a space switch is the basic component as well as the existing electrical switching system. A representative space switch, at the present stage, is a matrix switch to realize non-blocking type switching systems. Further, it is able to construct a large size space switch with a combination of a plurality of small size space switches, such as multi-stage switching networks. As well as the electrical matrix switch, the optical matrix switch (optical space switch) is formed by $n^2$ switching elements arranged in n rows and n columns so that n input highways and n output highways can be accomodated. In this matrix switch, switch elements are, of course, optical switches.

SUMMARY OF THE INVENTION

In the present invention, regardless of which output highway is selected, the optical signal from each input highway is passed through the same number of switch elements respectively, so that the levels of the output optical signals become equal and the loss characteristic and S/N are improved, the switch size can be enlarged, and a smaller size chip can be realized.

In an optical space switch according to the present invention, switch elements having two inputs and two outputs are arranged in an N×N matrix form; one of the input terminals of the switch elements arranged in a first column of each row is used as the input highway, and one of the output terminals of the switch elements arranged in the N th column of each row is used as the output highway; one of the switch elements is selectively controlled for connecting between one of the input highways and one of the output highways, so that the output can be obtained from any input highway; and each of the outputs of the switch elements is connected to an input of the next column of the switch elements.

BEST MODE FOR CARRYING OUT THE INVENTION

A conventional optical space switch is usually formed as a matrix, called a busbar structure. For example, as shown in FIG. 1, switch elements S11~Snn are arranged in a square and adjacent switch elements in the same row and in the same column are connected to each other.

Figures 1, 2, 3:
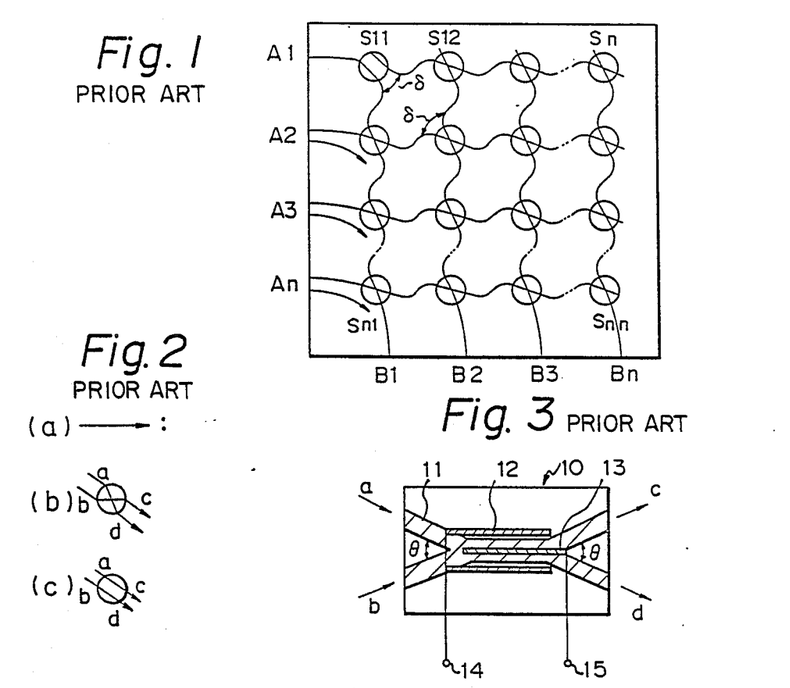
FIG. 1 is a block diagram of one example of conventional optic space switch.
FIG. 2 is a diagram for explaining a function of a switch element.
FIG. 3 is a diagram of the switch element.

The switch elements S11~Snn can be switched from a "CROSS" state in which the optical signal is led from an input terminal a to an output terminal d, and from an input terminal b to an output terminal c, as shown in FIG. 2(b), into a "BAR" state in which the optical signal is output from the input terminal a to the output terminal c and from the input terminal b to the output terminal d, as shown in FIG. 2(c).

Such switch elements S11~Snn can be realized by mechanically moving an optical fiber or a prism or a waveguide optical switch using a photo-electric effect or a photo-magnetic effect. In the switch elements using the photo-electric effect, titanium. (Ti), etc., is diffused on a substrate 10, using a photo-electric material such as $LiNbO_3$ shown in FIG. 3, so as to form a crossed optical waveguide 11, and electrodes 12 and 13 are connected to terminals 14 and 15 so that an electric field is applied to the crossing portion.

When an electric voltage $V_1$ is applied between the terminals 14 and 15, the optical signal from the input terminal a is led to the output terminal d and the optical signal from the input terminal b is led to the output terminal c, so that the state shown in FIG. 2(b) is realized. Further, when the electric voltage $V_2$ ($\neq V_1$) is applied between the terminals 14 and 15, the optical signal from the input terminal a is led to the output terminal c and the optical signal from the input terminal b is led to the output terminal d, so that the state shown in FIG. 2(c) is realized. Therefore, by switching the electric voltage applied between the terminals 14 and 15, the optical basic switches can be switched to the states shown in FIG. 2(b) or FIG. 2(c).

In the conventional matrix switch structure shown in FIG. 1, in the idle state when any paths do not exist, all of the switch elements $S11 \sim Snn$ are in the state shown in FIG. 2(b). In this state, the optical signal from the input highway $Ai$ ($i=1, 2, 3, \ldots, n$) passes from the switch elements $Si1$ to $Sin$, and crosspoint can be formed at one of the switch elements $Sij$ ($j=1, 2, 3, \ldots, n$) which can lead the optical signal to output highway $Bj$. Then a non-blocking function can be realized, since, each input highway has only one crosspoint with each output highway. Therefore, when the switch element $Sij$ which forms a crosspoint between the input highway $Ai$ and the output highway $Bj$ is switched to the "BAR" state shown in FIG. 2(c), the path between $Ai$ and $Bj$ is settled.

The optical space switch structure as mentioned above has a disadvantage in that there is a large variation of output optical signal levels and the ratio S/N is degraded, and thus the switch size is decreased. Further, when the switches are integrated on a single substrate, the length of the chip is increased, and accordingly, the degree of integration can not be increased.

The output level variation of the output optical signals will be first explained. In FIG. 1, when the optical signal is switched from the input highway A1 to the output highway B1 at the switch element S11, the optical signal passes n switch elements $S11 \sim Sn1$, and when the optical signal is switched from the input highway An to the output highway B1 at the switch element Sn1, the optical signal passes only one switch element Sn1. As the optical signal is attenuated at each switch element, then in the highway B1, the optical signal level from the input highway A1 becomes lower than the level from the input highway An, by the amount of loss due to (n−1) switch elements. Further, the path from the input highway A1 to the output highway Bn is the worst path which receives the atenuation in (2n−1) switch elements, and the switch size n is restricted by the amount of loss in this worst path, the deviation of the number of the switch elements in each paths causes the insertion loss properties in the optical space switch to degrade. The minimum light receiving level depends on the number of the switch elements in the worst path, the allowable insertion loss in the optical space switch is determined by a light emitting power in a light emitting element and a minimum light receiving level in a light receiving element, and thus the insertion loss in the optical space switch is smaller, and the switch size can be increased.

Next, S/N will be discussed. The optical signal which passes many switch elements and is attenuated is subject to be disturbed by other optical signals which pass fewer switch elements and receive less attenuation. That is, the optical signal which passes from the input highway A1 to the output highway B1 and is attenuated by n switch elements receives cross-talk directly from the signal from the input highways A2 to An, so that the S/N ratio is deteriorated. Further, when the switch size n is increased, the difference between the number of switch elements which pass the optical signal from the input highway A1 and the number of switch elements which pass the cross-talk noise of the optical signal from the input highways A2 to An, is increased, and thus the S/N ratio is deteriorated. The S/N has an affect on the bit error rate of the received optical signal, and the allowable S/N is determined by an allowable bit error rate. Of course, the better the S/N, the more the switch size n can be increased. However, the maximum switch size is determined by both the loss and the ratio S/N, and therefore, the smaller size n among the maximum switch size for the loss and the maximum switch size for the S/N becomes the actual maximum switch size.

Figure 4:
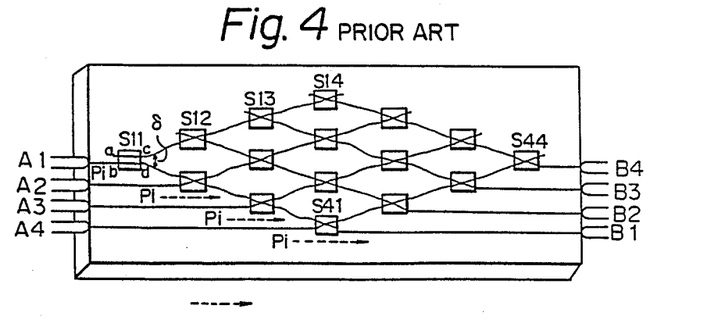
FIG. 4 is a block diagram of the arrangement of one example of the conventional optical space switch.

The switch element shown in FIG. 3 is a bipolar type, which is one kind of waveguide optical switch. Usually, a crossing angle $\theta$ between the input terminals and between the output terminals of the waveguide type switch element is several degrees, and the waveguide 11 between the switch elements has a property such that when the waveguide 11 is acutely bent, the bending loss becomes large. Therefore, when the conventional optical matrix switch shown in FIG. 1 is integrated on a single substrate, to reduce the cross angle ($\delta$) as shown in FIG. 4, the (2n−1) switch elements must be arranged along the length of the chip and n switch elements along the width of the chip, and accordingly, a problem arises in that the length of the chip is increased.

Figure 5:
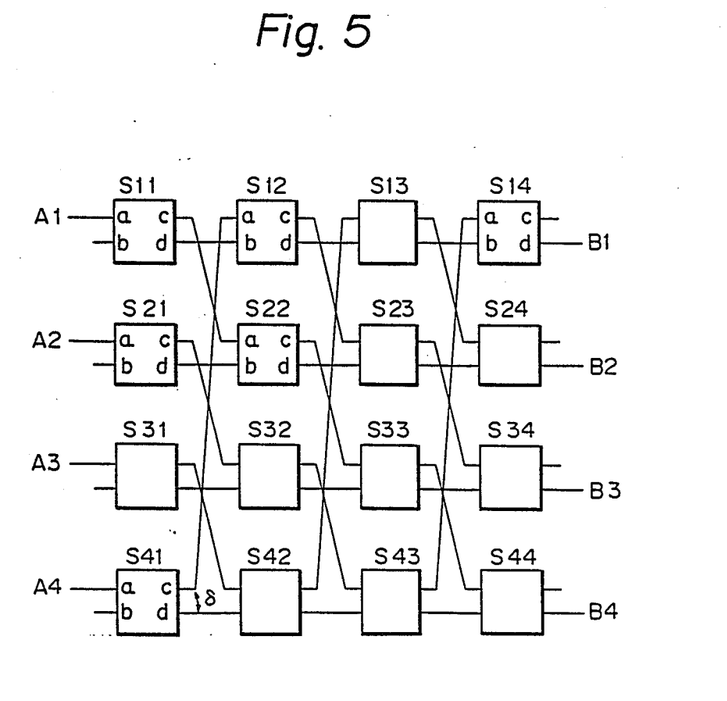
FIG. 5 is a block diagram of a first embodiment of an optical space switch of the present invention.

FIG. 5 is a block diagram of a first embodiment of the present invention. As shown in FIG. 5, a first column is formed by switch elements $S11 \sim Sn1$ having two inputs and two outputs or one input and two outputs, a second column to the (n−1)th column are formed by $n \times (n-2)$ switch elements $S12 \sim Sn(n-1)$ having two inputs and two outputs, an Nth column is formed by n switch elements $S1n \sim Snn$ having two inputs and one output or two inputs and two outputs. Then, the switch elements $S1n \sim Snn$ are arranged in n columns and n rows, one output terminal of the switch elements at an ith row and a jth column is connected to one input terminal of the switch elements a ith row, (j+1) column and another output terminal of the switch elements at the ith row and jth column is connected to another input terminal of the switch element at the (i+1)th row, except for the nth row and (j+1)th column, the row of the switch elements to which the other output terminals are connected is made different at every column. One input terminal of the switch elements of the first column of each row is made the n input terminal and one output terminal of the switch elements of the n'th column of each row are used as the output terminals. FIG. 5 shows the case when n=4 and all switch elements are formed as two inputs and two outputs. The input terminals a of the switch elements $S11 \sim S41$ at the first column form n input terminals and the output terminals d of the switch elements $S14 \sim S44$ at the n'th column form n output terminals.

Therefore, an optical signal from the input terminal A1 to the output terminals $B1 \sim B4$ always passes 4 switch elements, and similarly, all optical signals from input terminals $A2 \sim A4$ to any of the output terminals $B1 \sim B4$ also pass 4 switch elements. Therefore, the number of switch elements which are passed by the optical signal are the same, so that a variation of the output levels of the optical signals does not occur. Further, cross-talk noise, which disturbs the optical signal from other paths, passes the same number of switch elements and receives the same attenuation, so that the S/N ratios of the paths are not deteriorated.

Hereinafter the embodiment shown in FIG. 5 will be explained in detail. FIG. 5 shows an optical space switch having 4 inputs and 4 outputs. Each switch element S11~S44 is formed, for example, as shown in FIG. 3, as two inputs and two outputs, and they are arranged in 4 columns and 4 rows. One output terminal c of the switch element Sij at the ith row and jth column (i, j=1~4) is connected to one input terminal a of the switch element S (i+1) (j+1) in the (i+1)th row and the (j+1)th column. For example, if i=1, j=1, one output terminal c of the switch element S11 is connected to one input terminal a of the switch element S22. Similarly, if i=4, j=1, one output terminal c of the switch element S41 is connected to one input terminal a of the switch element S12 at the first row and second column. (When i+1>n, i+1−n is used, and therefore i=4, it is connected to the switch element S1j in the first row).

Another output terminal d of the switch element Sij is connected to another input terminal b of the switch element Si (j+1) at the i th row and (j+1) th column. For example, if i=1, j=1, another output terminal d of the switch element S11 is connected to another input terminal b of the switch element S12 at the first row and second column. Similarly, if i=4, j=1, another terminal d of the switch element S41 is connected to another terminal b of the switch element S42 at the 4th row and second column. Similarly, the switch elements S11~S44 are each connected as shown in FIG. 5, wherein one input terminal a of the switch elements S11~S41 at each row and first column are formed as 4 input terminals A1~A4, and one output terminal d of the switch elements S41~S44 at each row and 4th column are formed as 4 output terminals B1~B4.

When each switch element Sij is in the idle state in which the input terminal a and the output terminal c, and the input terminal b and the output terminal d of each switch element Sij are connected, the optical signal from the input terminals A1~A4 is not led at any output terminals B1~B4. Then, it is obvious that each input highway A1~A4 has a crosspoint with each output highway B1~B4, so that this space switch is non-blocking type like the matrix switch. However, when the switch element S11 is switched to the state in which the input terminal a and the output terminal d, and the input terminal b and the output terminal c, are connected, the optical signal from the input terminal A1 is led at the output terminal B1. In this case, the optical signal passes 4 switch elements. Further, when the switch element S12 is switched to the state in which the input terminal a and the output terminal d, and the input terminal b and the output terminal c, are connected, the optical signal from the input terminal A4 is output at the output terminal B1. In this case, the optical signal also passes 4 switch elements.

As mentioned above, when the optical signal from the input terminals A1~A4 is led to any of the output terminals B1~B4, the optical signal passes the same number of the switch elements, and therefore, a variation of the output optical level does not occur. When the 4×4 structure is extended to n×n optical switches, the optical signal to be output always passes the same number n of switch elements.

Figure 6:
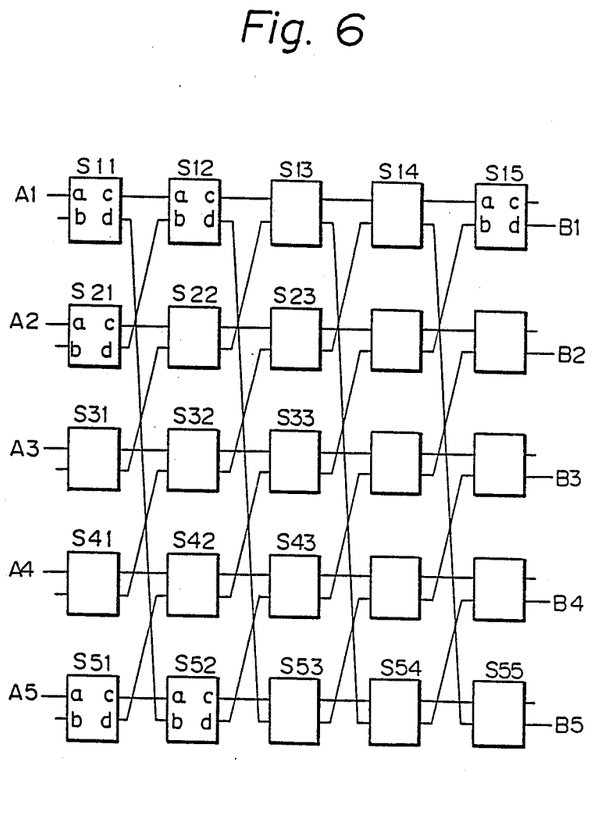
FIG. 6 is a block diagram of a modification of the first embodiment shown in FIG. 5.

FIG. 6 is a modified embodiment of FIG. 5, and shows the optical space switch having 5 input terminals and 5 output terminals. In this embodiment, when each of the switch elements S11~S55 is controlled to the idle state in which an input terminal a and an output terminal c, and an input terminal b and an output terminal d, are connected, and as well as FIG. 5, each input highway A1~A5 has a crosspoint with each output highway B1~B5.

Further, the arrangement and the number of each switch element in FIG. 6 is different from the embodiment of FIG. 5, however, when the position of each column is changed, it corresponds to the embodiment of FIG. 5. For example, when S52 is arranged at a position of S12 at the second column, S12 at S22, S22 at S32, S32 at S42, S42 at S52, S43 is arranged at a position S13, S53 at S23, S13 at S33, S23 at S43, S33 at S53, and a similar change of the arrangement is carried out in the 4th column and 5th column, FIG. 6 has the connecting relationship explained with respect to FIG. 5.

In FIG. 6, one output terminal d of the switch elements S15~S55 of 5th column of each row is used as the output terminals B1~B5, however, it is possible to use another output terminal c instead.

In the embodiment shown in FIG. 6, the optical signal to be led to the output terminals B1~B5 always passes the same number of switch elements, and thus the optical signal always suffers the same insertion loss, and therefore, level variation due to the selection control of the switch elements does not occur.

Further, the switch elements of the first column of each row may be formed as one input and two outputs and the switch elements of the nth column of each row may be formed as two inputs and one output.

However, in the optical space switch shown in FIG. 5, the number of crosspoints of connecting lines which connect between the output terminal and the input terminal of the switch element is high. Further, the first row switch element and the 4th row switch element are connected, and thus the connecting angle $\delta$ thereof becomes very large, so that this waveguide needs a small radius of curvature. Therefore, the size of a chip where the optical switch elements are integrated on a substrate must be increased, and thus a problem occurs when the switch must be integrated with a small size.

Figure 7:
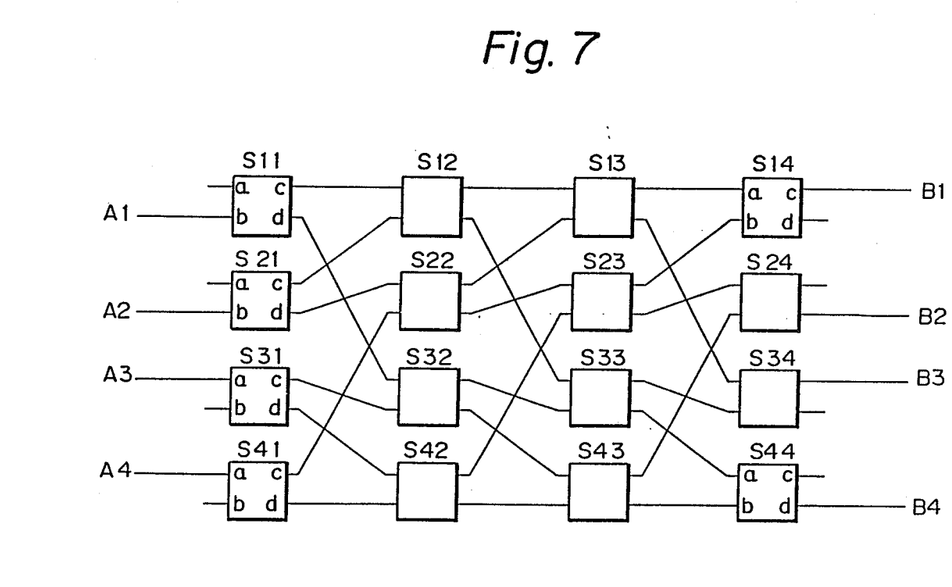
FIG. 7 is a block diagram of a second embodiment of the present invention.

For removing the above-mentioned problem, a second embodiment of the present invention shown in FIG. 7 is provided.

FIG. 7 shows the case of a 4×4 optical space switch. Each of the switch elements S11~S44 has two inputs and two outputs and they are arranged as 4 rows and 4 columns. Concerning the connections between switch elements S11~S41 belonging to the first column and switch elements S12~S42 belonging to the second column, an upper output of S11 is connected to an upper input of S12, a lower output of S11 to an upper input of S32, an upper output of S21 to a lower input of S12, a lower output of S21 to an upper input of S22, an upper output of S31 to a lower input of S32, an upper output of S41 to a lower input of S22, a lower output of S41 to a lower input of S42, similar connections are carried out for the switch elements between the second column and third column and between the third column and the fourth column, and lower inputs of S11 and S21 and upper inputs of S31 and S41 are used as input highways and upper outputs of S14 and S34 and lower outputs of S24 and S44 are used as output highways.

Concerning the switch elements S11~S14 arranged on the first row and the switch elements S41~S44 arranged on the 4th row, the upper input thereof is connected to the upper output and the lower input thereof is connected to the lower output. When the switch elements S11~S14 and S41~S44, which are arranged in the first and fourth row in a "BAR" state as shown in FIG. 2(c), and the switch elements S21~S24 and S31~S34 which are arranged in the second and third row in the "CROSS" state shown in FIG. 2(b), the optical signal input from input terminals A1~A4 is not led to output terminals B1~B4. However, for example, when S11 is switched from the "BAR" state to the "CROSS" state, the optical signal from the input terminal A1 is led to the output terminal B1. Further, for example, when S33 is changed from the "CROSS" state to the "BAR" state, the optical signal from the input terminal A2 is connected with the output terminal B3.

Figure 8A:
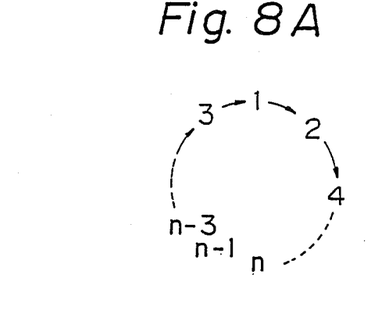
FIGS. 8A and 8B are diagrams showing the principle of the construction of the second embodiment of the present invention.
Figure 8B:
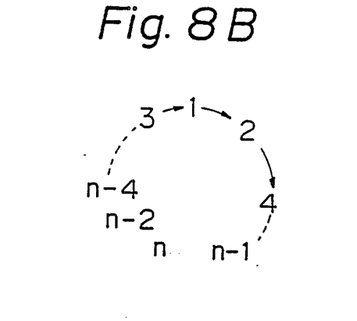

The principle of the construction of the second embodiment is explained by FIG. 8A and FIG. 8B. When n is an even number, as shown in FIG. 8A, except for a first row, rows having an even number, such as a first row and a second row, a second row and a fourth row, are connected first in the increasing row number direction. Then except for a n'th row, the rows having an odd number, such as n'th row and (n−1)th row, (n−1)th row and (n−3)th row, are connected in the decreasing row number direction. FIG. 8A shows the case of a clockwise direction, but it is same in the counter clockwise direction. FIG. 8B shows the case when n is an odd number.

The above-mentioned structure is realized as shown in FIGS. 9A to 9D. In FIGS. 9A to 9D, only the switch elements of the first column and the second column are shown, and the construction of the other columns is the same.

Figure 9A:
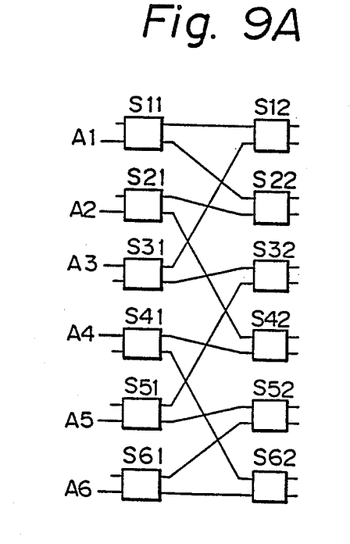
FIGS. 9A to 9D are diagrams showing the second embodiment due to the principle shown in FIGS. 8A and 8B.
Figure 9B:
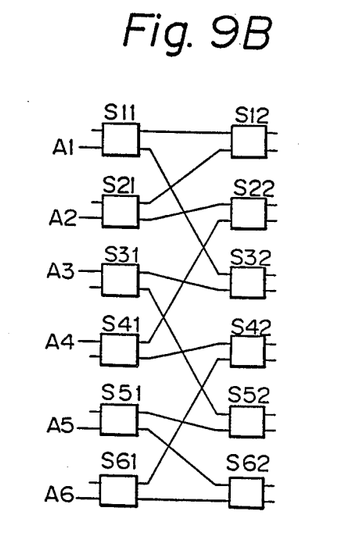

FIG. 9A shows the case wherein n is an even number and connected in the clockwise direction shown in FIG. 8A, and FIG. 9B shows the case wherein n is an even number and connected in the direction counterclockwise to that shown in FIG. 8A.

Figure 9C:
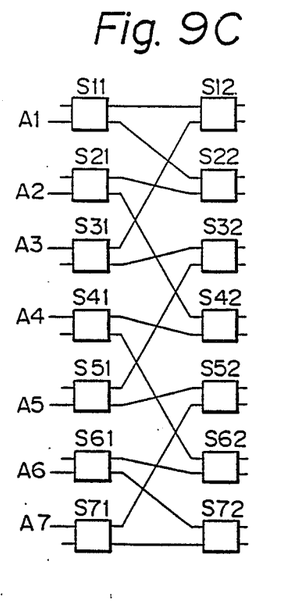
Figure 9D:
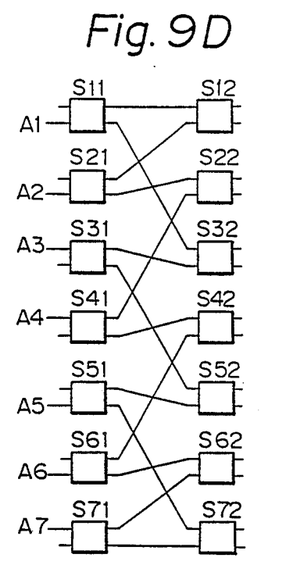

FIG. 9C shows the case wherein n is an odd number and connected in the clockwise direction shown in FIG. 8B, and FIG. 9D shows the case wherein n is an odd number and connected in the direction counterclockwise to that shown in FIG. 8B.

In the first embodiment and the second embodiment, the switch elements in each output highway can have the same number of rows, and in each output highway, one output and one input of the switch elements in the same row are connected. Thus, the crosspoint between each input highway and each output highway can be easily controlled. That is, the crosspoints between the output highway of first row and each input highway are all in the first row, which simplifies the switching control.

Conversely, in the third embodiment as mentioned hereinafter, the crosspoint is not in the same row as the output highway, but in another row. Therefore, the control becomes somewhat complicated but the construction can be miniaturized.

Figure 10:
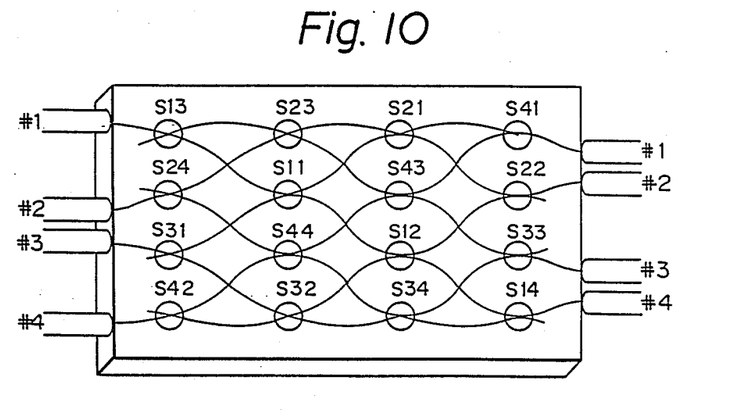
FIGS. 10 and 11 are diagrams showing a third embodiment of the optical space switch according to the present invention.
Figure 11:
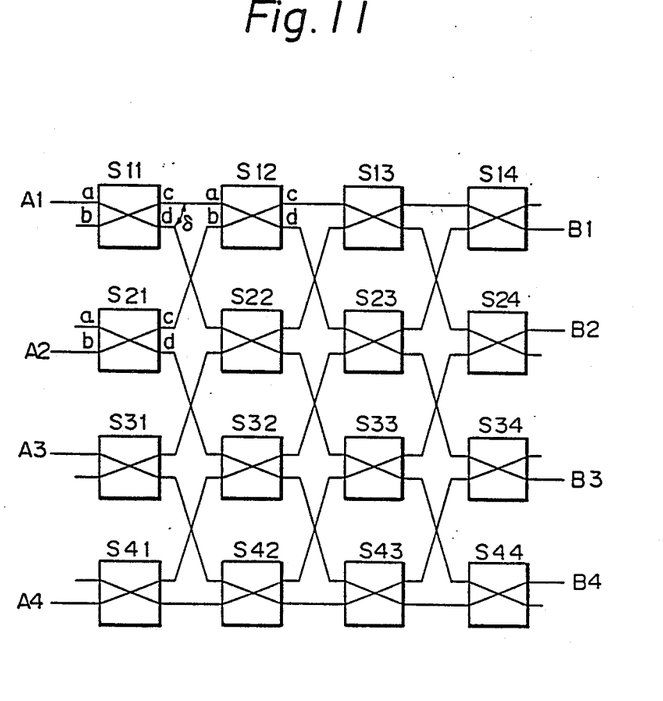

FIG. 10 is an optical space switch of a third embodiment of the present invention, wherein n=4, that is, 4 input highways and 4 output highways are included. In FIG. 10, the symbol of the switch elements is shown by the position of the crosspoint. For example, S13 means the switch element at the position where the input highway #1 and the output highway #3 cross. S13 in FIG. 10 corresponds to S11 in FIG. 1. FIG. 11 is a block diagram of the embodiment shown in FIG. 10, and in FIG. 11, all switch elements are in the state shown in FIG. 2(b), to obtain an idle state in which no path exists. Here, the explanation will be given by using FIG. 11.

Figure 12:
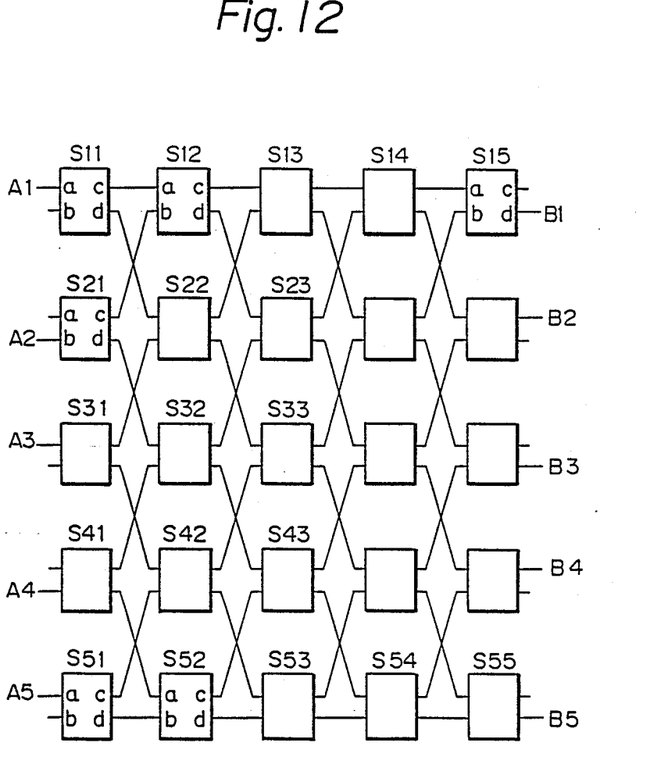
FIG. 12 is a diagram showing a modification of the third embodiment shown in FIGS. 10 and 11.

In FIG. 11, input highways Ai (i=1, 2, 3, 4) are connected to switch elements Si1 of ith row and first column, that is, the input highways in which i is odd number are connected to an input terminal a of the switch elements and the input highways in which i is an even number are connected to an input terminal b of the switch elements. Output highways Bj (j=1, 2, 3, 4) are connected to the switch elements Sjn of the jth row and n'th column, that is, the output highways in which j is an odd number are connected to an output terminal d of the switch elements and the output highways in which j is an even number are connected to an output terminal c of the switch elements. The connection between switch elements is restricted to the connection between adjacent switch elements, and the output terminal c of the switch element is connected to the input terminals b of the switch element positioned at the upper row. When the upper row to be connected does not exist, the output terminal c of the switch element at upper row is connected to an input terminal a of the switch element in the same row. Further, the output terminal d of the switch element is connected to the input terminal a of the switch element positioned at the lower row. When the lower row to be connected does not exist, the output terminal d of the switch element at the lower row is connected to an input terminal b of the switch element in the same row. By such connectons, each input highway has one crosspoint with each output highway. For example, the path of the input highway A1 is S11→S22→S33→S44 in the idle state, and has a crosspoint with output highway B3 at S11, with output highway B1 at S22, with output highway B2 at S33, and with output highway B4 at S44. Similarly, the path of the input highway A3 is S31→S42→S43→S34 in the idle state, and has a crosspoint with output highway B1 at S31, with output highway B2 at S42, with output highway B4 at S43, and with output highway B3 at S34. Therefore, the structure shown in FIG. 11 is a nonblocking type, and any path between each input highway and each output highway can be formed by switching the switch element as shown in FIG. 2(c). At this time, the optical signal from the input highway passes one switch element of each column, then passes 4 switch elements, the same as the number of columns, so that the number of the switch elements through which the optical signal passes is not varied, and thus the output optical signal levels are not varied. When the embodiment formed by 4×4 shown in FIG. 11 is extended to an n×n optical space switch, the optical output signal passes the same number n of switch elements. FIG. 12 shows the embodiment having a 5×5 construction, and the switch elements are arranged as 5 columns and 5 rows, similar to the embodiment shown in FIG. 11, the switch elements of adjacent columns and rows are connected, but in the uppermost row and in the lowermost row, the switch elements in the same row are connected.

The switch elements positioned at the first column of each row may be formed as one input and two outputs and the switch elements positioned at the n'th column of each row may be formed as two inputs and one output. Further, in FIGS. 11 and 12, the input terminals a, b and the output terminals c, d are shown as physical positions; that is, the input terminal a and the output terminal c are defined as the terminal near the upper row and the input terminal b and the output terminal d are defined as the terminal near the lower row. When the position of the input terminals a and b and that of the output terminals c and d are reversed, a similar construction may be obtained. For example, in FIG. 11, the output terminal c of the switch element S11 is connected to the input terminal a of the switch element S12, and the output terminal c of the switch element S21 is connected to the input terminal b of the switch element S12. However, the example in which the output terminal c of the switch element S11 is connected to the input terminal b of the switch element S12, the output terminal c of the switch element S21 is connected to the input terminal a of the switch element S12, and the switch element S12, when no path exists, is in the state shown in FIG. 2(c), is a modified embodiment of the present invention. However, as shown in FIG. 11, for example, when the output terminal c of the switch element S11 is connected to the input terminal a of the switch element S12 and the output terminal c of the switch element S21 is connected to the switch element S12, an advantage is obtained from the viewpoint that the length of the wiring becomes short, and thus a minimum size chip can be formed.

As explained above, the present application is formed in such a manner that the switch elements S11~Snn each having two inputs and two outputs are arranged as n columns and n rows, and the switch elements are connected so that any optical signals from the input highways to the output highways pass the same number of switch elements. Accordingly, the insertion losses are equal for all paths, and the level of the output signals does not vary due to the path. Further, the insertion loss is reduced by about half, compared to the number of switch elements passed in the worst condition in the conventional matrix switch. further, optical noise due to the cross talk of the optical signal is decreased, the S/N can be improved, and thus the switch size can be increased. Further, as shown in FIG. 11, the cross angle (δ) between input terminals and between output terminals can be decreased, so that n switch elements may be arranged along the direction of the chip length, compared with the case of FIG. 4 where (2n−1) switch elements are conventionally arranged along the direction of the chip length.

As can be seen from the above description, the optical space switch according to the present invention can be very effectively used in an optical fiber system which is used in a high speed information service.

We claim:

1. An optical space switch comprising:
    switch elements, each having a non-switched state and a switched state, and each having two input terminals and two output terminals, said switch elements arranged in an n×n matrix form of n columns and n rows, where n is an integer;
    one input terminal of each of said switch elements arranged in the first column of each row of the matrix being used as one of n input highways, and the other input terminal thereof being used as a dead terminal,
    one output terminal of each of said switch elements arranged in an n'th column of each row of the matrix being used as one of n output highways, and the other output terminal thereof being used as a dead terminal,
    the output terminals of each of said switch elements except for said switch elements arranged in the n'th column of each row of the matrix being respectively connected to the input terminals of the switch elements of a next column,
    any one of said n input highways being connectable to any one of said n output highways by switching no more than one of said switch elements to the switched state.

2. An optical space switch according to claim 1, wherein:
    one output terminal of said switch element positioned at the ith row and Jth column, except for the first row and Jth column, is connected to one input terminal of said switch element positioned at the (i−1)th row and (J+1)th column,
    one output terminal of said switch element positioned at the first row and jth column is connected to one input terminal of said switch element positioned at the first row and (J+1)th column, the other output terminal is connected to one input of said switch element positioned at the (i+1)th row and (J+1)th column, except for the nth row and Jth column, where i and J are integers, i≦n, and J≦n,
    the other terminal of said switch element positioned at the n'th row and J th column is connected to one input terminal of said switch element positioned at the n'th row and (J+1)th column.

3. An optical space switch according to claim 1, wherein one output of said switch element at the ith row and Jth column is connected to one input of said switch element at the ith row and (J+1)th column where J and i are integers, and i<n.

4. An optical space switch according to claim 3, wherein the other output of said switch element at the n'th row and jth column is connected to the other input of said switch element at the first row and (J+1)th column, and the other output of said switch element at the ith row and Jth column is connected to the other input of said switch element at the (i+1)th row and (J+1)th column.

5. An optical space switch according to claim 3, wherein the other output of said switch element at the first row and Jth column is connected to the other input of said switch element at the n'th row and (J+1)th column, and the other output of said switch element at the ith row and Jth column is connected to the other input of said switch element at the (i−1) th row and (J+1)th column, where i>1.

6. An optical space switch according to claim 3, wherein:
    p is an even number and p≦n;
    the other output of said switch element at the first row and Jth column is connected to the other input of said switch element at the second row and (J+1)th column;
    the other output of said switch element at the pth row and Jth column is connected to another input of said switch element at the (p+2)th row and (J+1)th column;
    the other output of said switch element at the (p+1)th row and Jth column is connected to another input of said switch element at the (p−1)th row and (J+1)th column;
    when n is an even number, the other output of said switch element at the n'th row and Jth column is connected to the other input of said switch element at the (n−1)th row and (J+1)th column, and when n is an odd number, the other output of said switch element at the (n−1)th row and Jth column is connected to the other input of said switch element at the n'th row and (J+1)th column.

7. An optical space switch according to claim 3, wherein:
    p is an odd number and p≦n;

the other output of said switch element at the second row and J th column is connected to the other input of said switch element at the first row and (J+1)th column;

the other output of said switch element at the pth row and Jth column is connected to the other input of said switch element at the (p+2)th row and (J+1)th column;

the other output of said switch element at the (p+1)th row and Jth column is connected to the other input of said switch element at the (p−1)th row and (J+1)th column;

when n is an even number, the other output of said switch element at the (n−1)th row and Jth column is connected to the other input of said switch element at the n'th row and (J+1)th column, and when n is odd number, the other output of said switch element at the n'th row and Jth column is connected to the other input of said switch element at the (n−1)th row and (J+1)th column.

8. An optical space switch comprising:

switch elements having a non-switched state and a switched state, and each having two input terminals and two output terminals arranged in an n×n matrix form;

one input terminal of eachof said switch elements arranged in a first column of each row being used as one of n input highways, the other input terminal thereof being used as a dead terminal, one output terminal of eachof said switch elements arranged in an n'th column of each row being used as one of n output highways, the other output terminal thereof being used as a dead terminal, one output terminal of said switch element positioned at the i th row and the J th column being connected to one input of said switch element positioned at the (i−1) th row and the (J+1) th column, except for the first row and J th column;

one output terminal of said switch element positioned at the first row and the J th column being connected to one input terminal of said switch element positioned at the first row and the (J+1) th column;

the other output terminal of said switch element at the first row and the J th column being connected to one input terminal of said switch element positioned at the (i+1) th row and the (J+1) th column, except for the n'th row and J th column, the other output terminal of said switch element positioned at the n'th row and the J th column being connected to one input terminal of said switch element positioned at the n'th row and (J+1) th column, any one of said n input highways being connectable to any one of said n output highways by switching no more than one of said switch elements to the switched state, where n, J and i are integers, and i≦n, J>n.

* * * * *

UNITED STATES PATENT AND TRADEMARK OFFICE
CERTIFICATE OF CORRECTION

PATENT NO. : 4,837,855

DATED : JUNE 6, 1989

INVENTOR(S) : HAJIKANO ET AL.

It is certified that error appears in the above-identified patent and that said Letters Patent is hereby corrected as shown below:

Col. 2, line 10, "optic" should be --optical--.

Col. 3, line 43, "atenuation" should be --attenuation--.

Col. 9, line 31, "further" should be --Further--.

Col. 10, line 11, "jth" should be --Jth--;
line 29, "jth" should be --Jth--.

Col. 11, line 26, "eachof" should be --each of--.

Col. 12, line 28, "J>n" should be --J<n--.

Signed and Sealed this

Sixth Day of February, 1990

*Attest:*

JEFFREY M. SAMUELS

*Attesting Officer*   *Acting Commissioner of Patents and Trademarks*